UNITED STATES PATENT OFFICE.

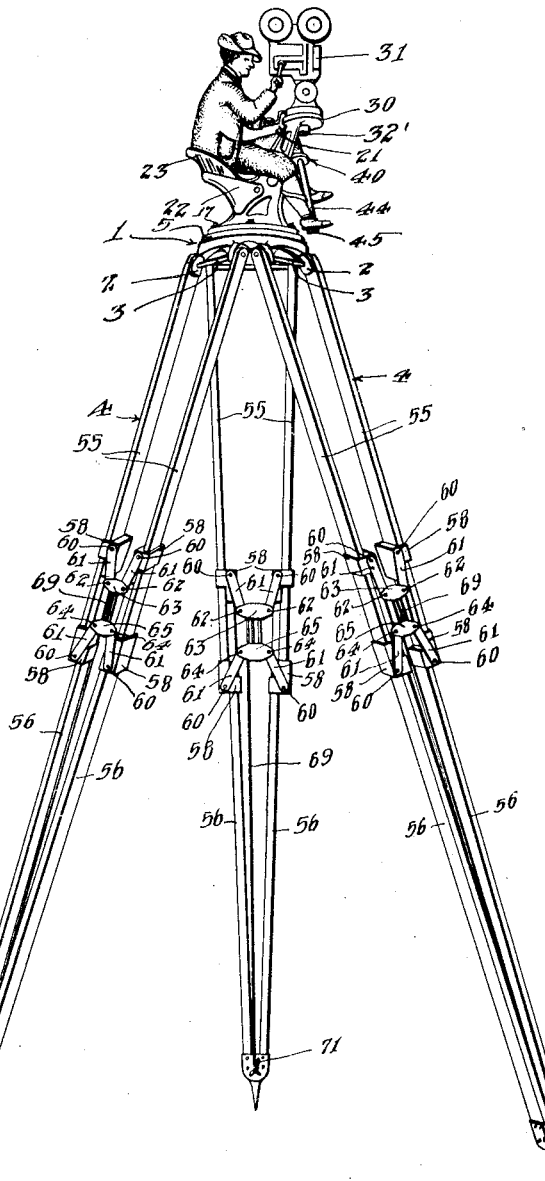

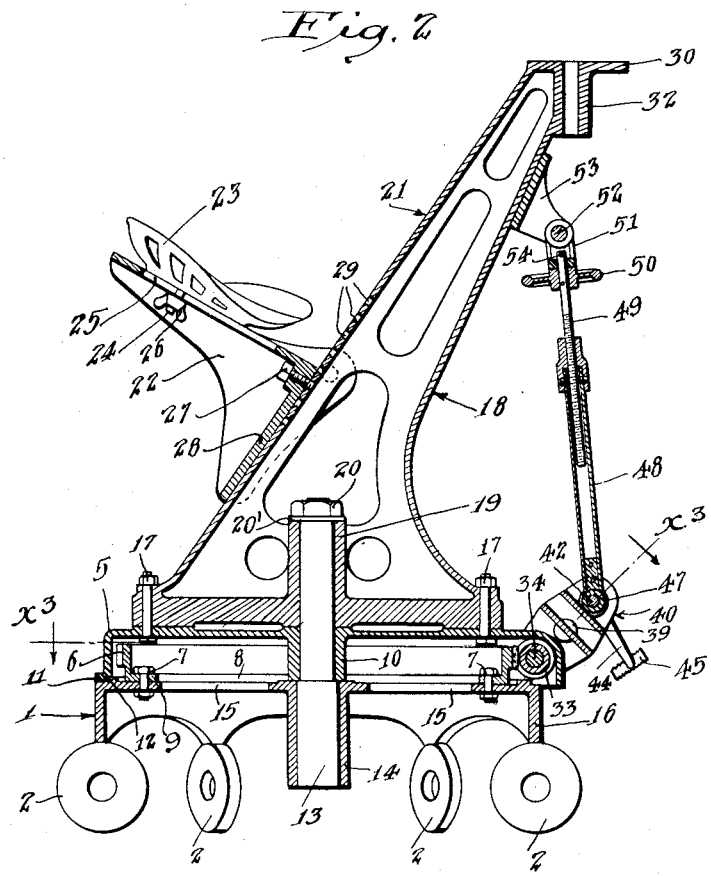
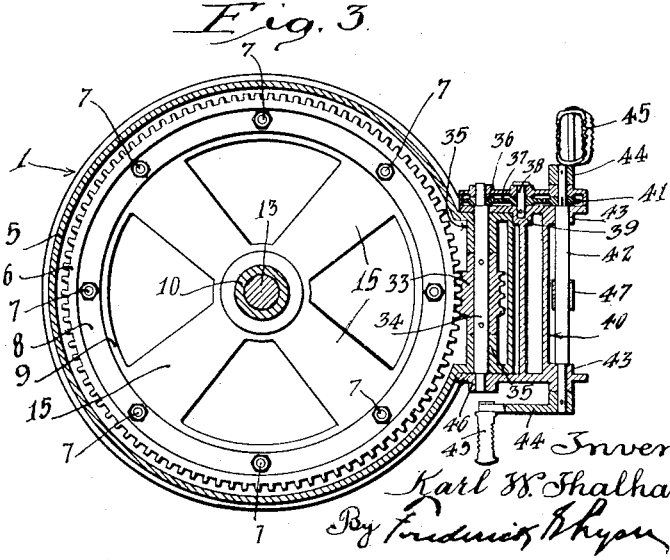

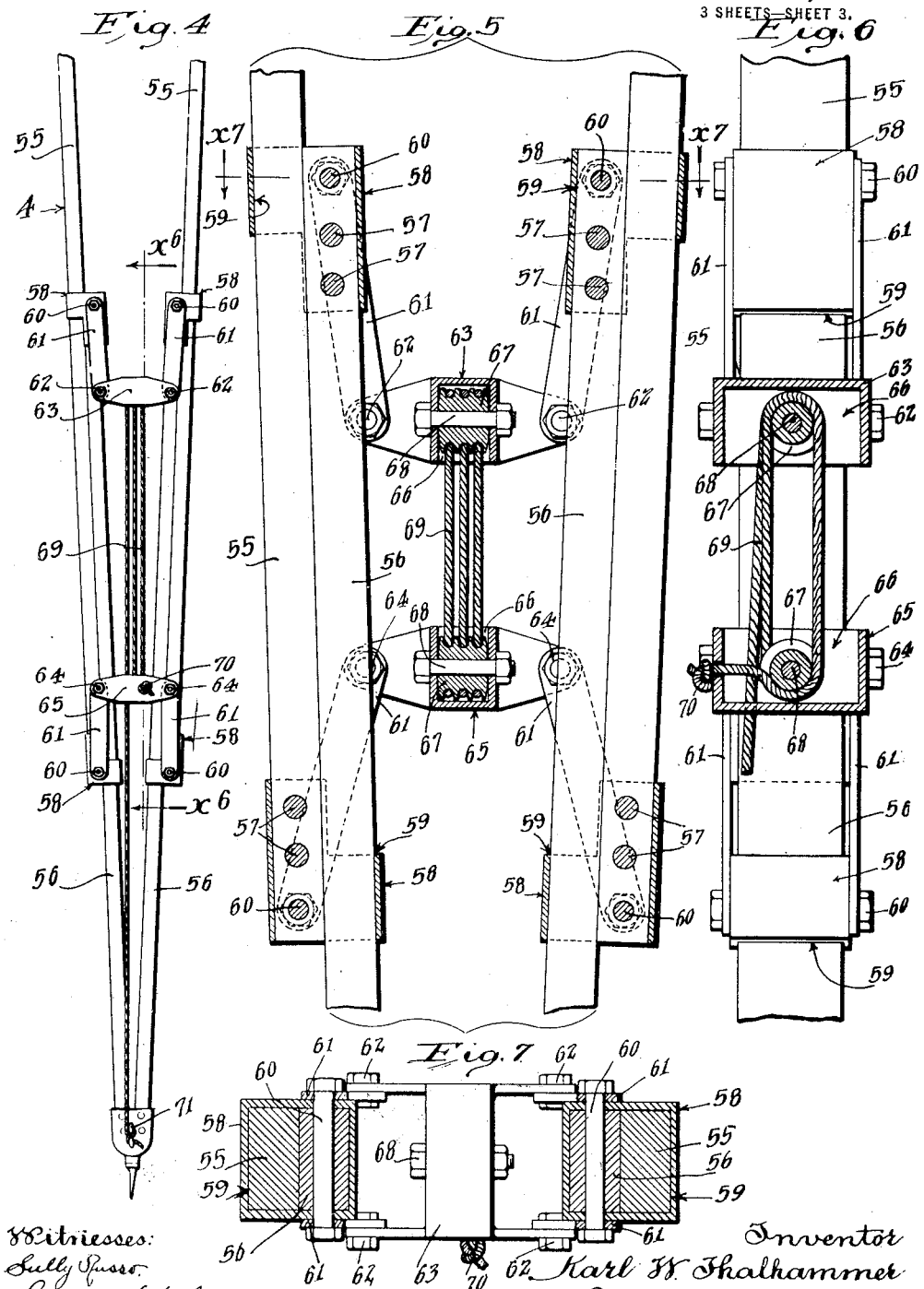

KARL W. THALHAMMER, OF LOS ANGELES, CALIFORNIA.

SUPPORT FOR MOTION-PICTURE CAMERAS.

1,358,402.   Specification of Letters Patent.   Patented Nov. 9, 1920.

Application filed April 15, 1919. Serial No. 290,222.

*To all whom it may concern:*

Be it known that I, KARL W. THALHAMMER, a citizen of Austria, residing at Los Angeles, in the county of Los Angeles and State of California, have invented a new and useful Support for Motion-Picture Cameras, of which the following is a specification.

This invention relates to a support on which a motion picture camera and its operator are mounted and an object of the invention, in general, is to provide means for elevating the camera and the operator considerably above the level of the actors so as to obtain a view of all of the actors in a given group.

Another object is to make provision for rotating the camera on the support so that while exposures are being made it may be turned in any direction desired for producing panoramic effects or for making the exposures in a fixed position.

Another object is to make provision for operating the camera-rotating mechanism by action of the operator's legs so that he can employ his hands in operating the camera for making exposures while at the same time turning the camera.

Another object is to make provision for increasing and decreasing the height of the support.

Other objects and advantages will appear in the subjoined detailed description.

The accompanying drawings illustrate the invention:

Figure 1 is a side elevation of a support made in accordance with the provisions of this invention, a motion picture camera also being shown mounted in place on the support and an operator also being shown seated on the support.

Fig. 2 is an enlarged elevation, partly in vertical mid section, of the support, the legs being omitted.

Fig. 3 is a plan section on the irregular line indicated by $x^3$—$x^3$, Fig. 2.

Fig. 4 is a side elevation of one of the legs of the support, a portion of the upper leg section being broken away to contract the view and the leg sections being shown in partly contracted positions.

Fig. 5 is an enlarged elevation, partly in section, of the middle portion of one of the legs.

Fig. 6 is an enlarged fragmentary elevation of one of the legs, partly in section, on line indicated by $x^6$—$x^6$, Fig. 4.

Fig. 7 is a plan section on the irregular line indicated by $x^7$—$x^7$, Fig. 5.

There is provided a base or platform 1 having perforated ears 2 to receive pins 3 which pass through the upper ends of legs 4, there being three such legs shown in Fig. 1. On the platform 1 is rotatively mounted a housing 5 for a spur gear 6 which is stationarily connected to the platform by bolts 7 passing through a horizontal annular flange 8 of the gear and through a horizontal annular flange 9 of the housing 5 so that the gear will be fixed relative to the platform 1. The gear 6 surrounds a hub 10 of the housing 5. The housing 5 is provided at its periphery with an annular tongue 11 which fits in an annular groove 12 at the periphery of the upper face of the platform 1. The hub 10 is rotatively mounted on a vertical stationary shaft 13 which is fixed at its lower end in a tubular seat or socket 14 connected by arms 15 with the rim 16 of the platform.

Fastened to the housing 5 by bolts 17 or their equivalents is a standard 18 which may be of any suitable construction. In the drawings the standard 18 extends aslant to the vertical and is provided with a hollow boss 19 at its lower end to receive the upper end of the shaft 13, there being a nut 20 on the upper end of said shaft to aid in holding the standard 18 down on the shaft, there being a washer 20' between the nut and hub 19. On a slanting face 21 of the standard 18 is mounted a bracket 22 provided with an adjustable seat 23 for the operator, said seat having a pin 24 accommodated in a slot 25 of the bracket 22 and the pin 24 being provided with a wing nut 26 adapted when tightened to hold the seat 23 in the position to which it is adjusted longitudinally of the bracket. The bracket 22 is adjustably fastened to the face 21 and such adjustable fastening may be of any suitable construction and in this instance comprises a cap screw 27 extending through a flange 28 of the bracket and selectively engaging in any one of a series of holes 29 in the face 21 of the standard.

The upper end of the standard 18 forms a shelf 30 adapted to support a camera 31 as shown in Fig. 1, the shelf 30 being provided with a hollow boss 32 to receive the fastening means 32' of the camera to hold the camera securely on the table 30.

Means are provided for rotating the housing 5 and, in this instance, said means are adapted to be operated by movement of the operator's legs and are constructed as follows: Engaging the gear 6 is a worm wheel 33 fixed on a shaft 34 which rotates in bearings 35 of the housing 5. The shaft 34 is provided with a spur gear 36 meshing with an idler spur gear 37 mounted on a stud 38 supported in bearings 39 of an adjustable bracket 40. The idler gear 37 is engaged by a spur gear 41 fixed to a crank shaft 42 which is journaled in bearings 43 of the adjustable bracket 40. The shaft 42 is provided at opposite ends with crank arms 44 having pedals 45 similar to the pedals used on bicycles. Rotation of the crank arms 44 causes rotation of the shaft 42, gear train 36, 37, 41, shaft 34 and worm gear 33 so as to turn the housing. The adjustable bracket 40 is provided with bearings 46 engaging the outer ends of the shaft 34. Thus the shaft 34 functions to pivot the inner end of the bracket 40 to the housing 5.

Suitable means are provided to adjustably support the outer end of the bracket 40 and these means may be constructed as follows: The shaft 42 is journaled intermediate of the bearings 43 in a bearing 47 on the lower end of a post comprising relatively adjustable sections 48, 49, the section 49 screw-threading into the section 48. The post section 49 is provided with a hand wheel 50 whereby the section 49 may be turned so as to elongate or shorten the post. The upper end of the post section 49 is rotatively mounted in a bearing 51 pivoted at 52 to a bracket 53 of the standard 18, said bracket 53 being positioned near the upper end of the standard. A pin 54 in the post section 49 prevents separation of said post section and bearing 51. It is clear that when the hand wheel 50 is turned to shorten the post the outer end of the bracket 40 will be raised or swung upward around the shaft 34, and that if the hand wheel 50 be turned to lengthen the post the outer end of the bracket will be lowered or swung downward around the shaft 34. These described rotative movements of the bracket 40 cause raising and lowering of the pedals 45 and therefore cause said pedals to be moved toward and from the seat 23 so that adjustment of the pedals 45 relative to the seat can be made to suit the length of the operator's legs.

Only one of the legs 4 will be described since they are alike and the description of one will suffice to describe all of them: Each of the legs 4 comprises an upper section formed of bars 55 and a lower section formed of bars 56 the bars 55 are wider apart at their upper ends than at their lower ends as are also the bars 56. To the lower ends of the bars 55 and the upper ends of the bars 56 are fastened by rivets 57, or their equivalents, slides 58 which are provided with rectangular orifices 59 to receive the bars 55 or 56 as the case may be, the slides 58 being arranged in pairs and there being an upper pair and a lower pair. The slides of the upper pair shiftably engage the bars 55 and the slides of the lower pair shiftably engage the bars 56. Each of the slides 58 is pivoted by bolts 60 or their equivalents to a pair of links 61. The links 61 of the upper pair of slides are pivoted by bolts 62 or their equivalents to a cross member 63, and the links 61 of the lower pair of slides are connected by bolts 64 or their equivalents to a cross member 65. Thus when the upper slides 58 move upwardly relative to the bars 55 to the wider part of the upper leg section the links 61 will permit the slides of each pair to move away from one another, as the distance between the leg bars increases; and vice versa, when the lower slides 58 are moved downwardly relative to the bars 56 the links 61 will allow the slides of each pair to move toward one another as the distance between the bars 56 decreases.

Means are provided to adjust the leg sections relative to one another and in this instance said means are constructed as follows: Formed in the cross members 63 and 65 are pulley housings 66 in which are positioned pulleys 67 journaled on pins which may be in the form of bolts 68 supported in the housings. Rove around the pulleys 67 is a cable 69, one end of which is fastened at 70 to the lower cross member 65 and the other end of which is wound around a fastening member 71 fastened to the lower end of the lower leg section as clearly shown in Fig. 4. The cable 69 is rove back and forth several times around the pulleys 67 so that said cable and pulleys together constitute a block and tackle for raising and lowering the upper leg section.

In practice, assuming that the legs are contracted, the camera will be mounted on the table 30 and suitably fastened thereto and the support will be placed in upright position with the lower ends of the legs spread substantially as shown in Fig. 1. The operator will then take his position on the seat 23 and attendants will operate the cables 69 to raise the upper sections of the legs to elevate the camera and its operator to the desired height, as in Fig. 1. In making the exposures the operator will operate the camera in the usual manner and when he desires to point the camera in a different direction he will operate the crank arms 44 in the appropriate direction with his feet to turn the standard 18. He may thus turn the standard, if desired, while operating the camera so as to cause turning of the camera in a horizontal plane while making a series of exposures. This turning of the camera is turned, in the motion picture art, "panning", and the term "panning" signifies that the camera is being turned while a series of exposures is being made so as to effect the making of exposures of a view which may include any number of degrees of the horizon swept by the lens of the camera.

I claim:

1. A support of the character described, comprising a platform, means to raise and lower the platform, a standard mounted on the platform and adapted to support a camera, and a seat attached to the standard.

2. A support of the character described, comprising a platform, means to raise and lower the platform, a standard rotative horizontally on the platform and adapted to support a camera, and a seat attached to the standard.

3. A support of the character described, comprising a platform, means to raise and lower the platform, a standard rotative horizontally on the platform and adapted to support a camera, a seat attached to the standard, and means to turn the standard.

4. A support of the character described, comprising a platform, legs for the platform, a standard mounted on the platform and adapted to support a camera, means to rotate the standard, and a seat attached to the standard.

5. A support of the character described, comprising a platform, legs for the platform, a standard rotative horizontally on the platform and adapted to support a camera, a seat on the standard, and means operative by the operator while on the seat to rotate the standard.

6. A support of the character described, comprising a platform, a standard rotative horizontally on the platform and adapted to support a camera, an operator's seat mounted on the standard, pedals for the operator's feet, and means operative by the pedals to rotate the standard.

7. A support of the character described, comprising a platform, legs for the platform, a standard rotative horizontally on the platform and adapted to support a camera, an operator's seat mounted on the standard, pedals for the operator's feet, and means operative by the pedals to rotate the standard.

8. A support of the character described, comprising a platform, a standard rotative horizontally on the platform and adapted to support a camera, an operator's seat mounted on the standard, a bracket connected with the platform to turn therewith and adjustable thereto, means to adjust the bracket toward and from the seat, and means on the bracket operative by movement of the operator's legs and connected with the standard to rotate said standard.

9. A support of the character described, comprising a platform, legs for the platform, a standard rotative horizontally on the platform and adapted to support a camera, an operator's seat mounted on the standard, a bracket connected with the platform to turn therewith and adjustable thereto, means to adjust the bracket toward and from the seat, and means on the bracket operative by movement of the operator's legs and connected with the standard to rotate said standard.

10. A support of the character described, comprising extensible legs, means rotatably mounted on the legs to support a camera and the operator of the camera, means to cause rotation of the supporting means, and means to change the length of the legs to change the height of the supporting means above the level of the surface on which the legs rest.

11. In a support of the character described, camera-holding means, and sectional legs for the camera-holding means, each section of each leg comprising a pair of spaced bars and the upper ends of the bars of each pair being spaced farther from one another than the lower ends of said bars, slides connected with the upper ends of the bars of one section and shiftably engaging the bars of the other section, other slides connected with the lower ends of the bars of the last named section and shiftably engaging the bars of said one section, and means operating to draw the slides of the upper section toward the slides of the lower sections.

12. In a support of the character described, camera-holding means, sectional legs for the camera-holding means, each section of each leg comprising a pair of spaced bars and the upper ends of the bars of each pair being spaced farther from one another than the lower ends of said bars, slides connected with the upper ends of the bars of one section and shiftably engaging the bars of the other section, other slides connected with the lower ends of the bars of the last named section and shiftably engaging the bars of said one section, links pivoted to the slides, a cross member pivoted to the links associated with the lower slides; and means to move the cross members toward one another to produce relative movement between the sections.

Signed at Los Angeles, California, this 9th day of April, 1919.

KARL W. THALHAMMER.

Witnesses:
GEORGE H. HILES,
L. BELLE WEAVER.